April 15, 1924.

T. E. MURRAY

TUBULAR DEVICE

Filed Oct. 26, 1921

1,490,123

Thomas E. Murray, INVENTOR

BY

ATTORNEY

Patented Apr. 15, 1924.

1,490,123

UNITED STATES PATENT OFFICE.

THOMAS E. MURRAY, OF BROOKLYN, NEW YORK.

TUBULAR DEVICE.

Application filed October 26, 1921. Serial No. 510,665.

*To all whom it may concern:*

Be it known that I, THOMAS E. MURRAY, a citizen of the United States, residing in the city of Brooklyn, county of Kings, and State of New York, have invented certain new and useful Improvements in Tubular Devices, of which the following is a specification.

My invention aims to provide certain tubular devices which can be made rapidly and economically of two parts, an inside member or bushing and an outside member or shell.

The accompanying drawings illustrate an embodiment of my invention.

Fig. 1 is a side elevation of a valve bonnet, of which

Figure 1:
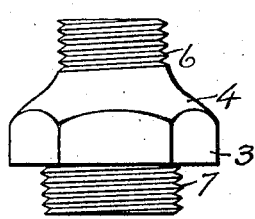
Figure 2:
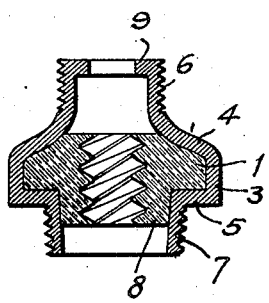
Figs. 2 and 3 are respectively vertical and horizontal sections.

Referring to the embodiment of the invention illustrated, there is an inside member 1 preferably of brass or other non-corrodible material formed with an inside thread and with hexagonal faces 2. Any other polygonal or non-circular shape may be used.

This inside member is embraced by an outside tubular member with an intermediate portion 3 fitting the polygonal contour of the inside member and with shoulders 4 and 5 embracing respectively the top and bottom of the inside member. The shoulder 4 merges into an extension 6 above the inside member, and from the shoulder 5 an extension 7 embraces a lower extension 8 on the inside member and extends slightly beyond the same. The extensions 6 and 7 are externally threaded and the former is provided with an inward flange 9 at its end.

Figure 3:
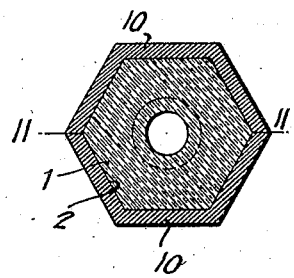
Figure 4:
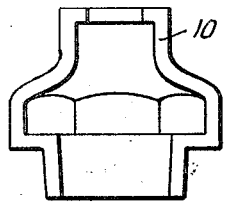
Fig. 4 is an inside face elevation of one of the outside members used in making the bonnet.
Figure 5:
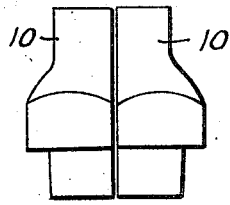
Fig. 5 is a side elevation of two of such members in juxtaposition.
Figure 6:
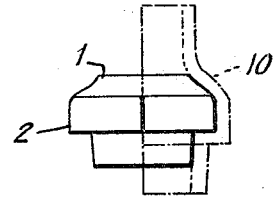
Fig. 6 is a side elevation of an inside member with one of the outside members shown in dotted lines.

The outer member is formed of a pair of segments 10, shown separately in Figs. 4 and 5. These are brought together, with the inside member enclosed between them, and are welded along their meeting edges along the dotted line 11, Fig. 3. By dividing the outer member at the angle of the polygon as shown each of the halves provides a flared recess which is easy to fit over the corresponding faces of the inner member. But it will be understood that the outer member may be formed of any desired number of segments and divided along other lines than that indicated. The screw threads 6 and 7 are best formed after the segments have been welded together. Instead of the threads illustrated the parts may be provided with various equivalent fastening means; or for some uses they may be left plain. Their form will depend on the uses to which they are to be put and on the tubes or other devices to which they are to be fastened.

For many purposes it is desirable to provide a bonnet, coupling or other tubular device with threads of brass or other non-corrodible material, but with the strength and resistance to abrasion of steel or iron. My invention provides an economical way of securing such a product. The outer shell is provided with a polygonal contour around its intermediate portion 3 for application of a wrench in order to screw the bonnet on to the top of a casing.

The invention is valuable also even where the internal member is not of brass or the like. The inner member and its thread can be formed accurately with well known machinery and the subsequent welding of the outer shell does not need to be particularly accurate. This is especially true in constructions in which there is no thread on the outer member. The segments of the outer member can be very economically pressed or drawn from sheet steel.

The invention is applicable also to a great variety of bushed tubular devices, whether the bushing or inside member be threaded or not. While the outer member or shell may be formed originally in any number of segments, it is particularly advantageous to form it in halves as illustrated, reducing the number of parts required to be formed in the beginning and keeping the welding down to a single operation.

Though I have described with great particularity of detail a certain embodiment of my invention yet it is not to be understood therefrom that the invention is restricted to the particular embodiment illustrated. Various modifications may be made by those skilled in the art without departure from the invention as defined in the following claims.

What I claim is—

1. A valve bonnet or the like comprising a threaded inside member or bushing of non-corrodible metal and an outside member formed of segments of steel welded together and embracing the inside member.

2. A valve bonnet or the like comprising a threaded inside member or bushing of non-corrodible metal and an outside member formed of segments of steel welded together and embracing the inside member, the outside member having a polygonal engagement with the inside member to prevent relative rotation and having a part overhanging the inside member to prevent relative longitudinal movement.

3. A bushed tubular device comprising an inside member and an outside member formed of segments welded together and embracing the inside member with a polygonal engagement to prevent relative rotation.

In witness whereof, I have hereunto signed my name.

THOMAS E. MURRAY.